No. 717,395.  
H. HALSEY.  
ELECTRIC BATTERY.  
(Application filed Apr. 18, 1902.)  
Patented Dec. 30, 1902.

(No Model.)

Witnesses  
Robert H. Ireland.  
Lester C. Taylor

Henry Halsey, Inventor  
By his Attorney  
C. W. Edwards.

THE NORRIS PETERS CO., PHOTO-LITHO., WASHINGTON, D. C.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 717,395, dated December 30, 1902.

Application filed April 18, 1902. Serial No. 103,649. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to batteries, and has particular reference to that class of batteries wherein mechanical depolarizing means are employed.

The object of the present invention is to provide an improved form of battery wherein the elements shall have a large active surface, wherein the parts shall be simple, readily assembled and taken care of, and wherein but a minimum of power will be required for operating the depolarizing means.

The invention will be described more particularly with reference to the accompanying drawings, in which—

Figure 1:
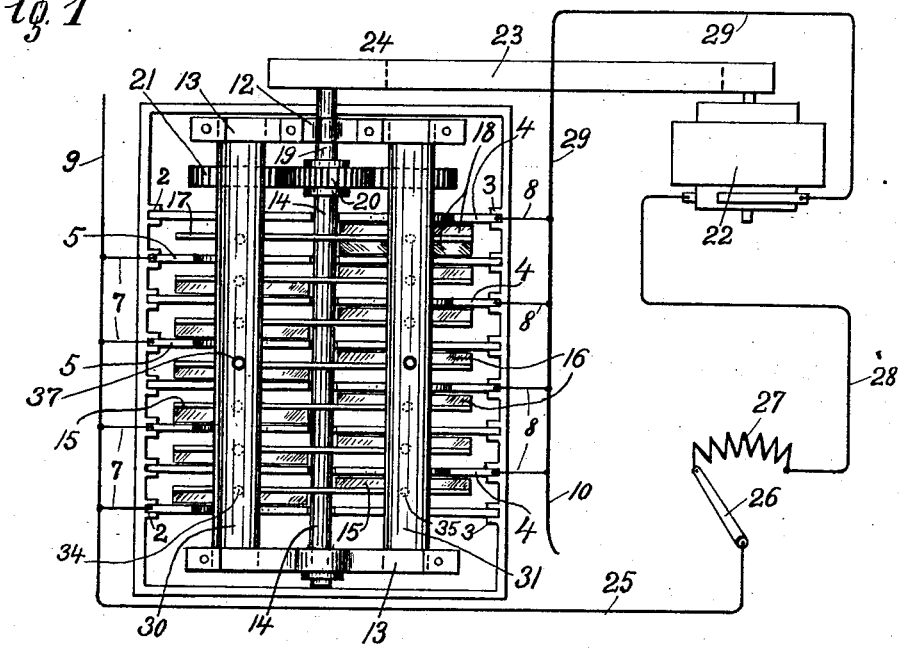
Figure 2:
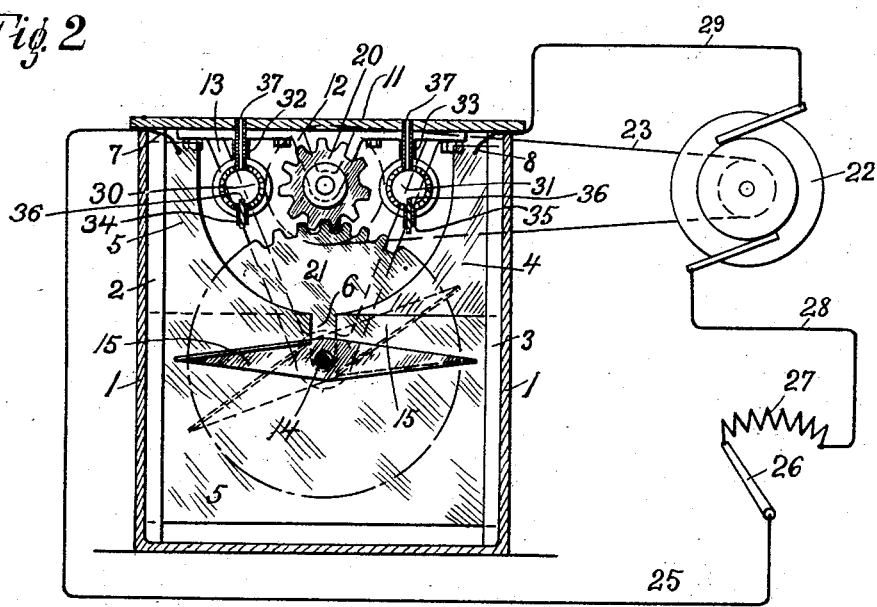

Figure 1 is a top view, with the cover removed, of a battery embodying my invention; and Fig. 2 is a sectional elevation of the same.

In the drawings, 1 represents a suitable receptacle, the respective sides of which are provided with grooves 2 3 2 3, in which the elements 4 5 4 5 are supported. The preferred shape of the elements 4 5 is shown in Fig. 2. The element 5 is there shown in full lines. A recess 6 is cut in the upper middle portion of each of the elements, and the upper ends of the elements of like polarity are respectively connected by wires 7 and 8 with the wires 9 and 10 of the external circuit.

Upon the cover 11 are carried the brackets 12 and 13. A shaft 14 has its bearings in the ends of the brackets 13, the shaft passing the length of the receptacle and being located in the several recesses 6 of the various elements when the cover is in place. Upon the shaft 14, in the spaces between the various elements, are mounted the arms 15. Arms 15 carry the contact-brushes 16, which lightly contact with the elements 4 and 5. These brushes preferably comprise strips of soft rubber attached to the arms 15. The arms 15 may be arranged upon the shaft 14 in any suitable manner. They may project outward upon both sides of the shaft, as shown, or, if preferred, the respective brushes may be set at an angle to each other, as shown in dotted lines in Fig. 2. A slightly-modified construction is illustrated in Fig. 1, wherein brush 17 projects outward from one side of the shaft and carries the brushes 18 18, which brushes are adapted to brush the respective elements 4 and 5. When this construction is employed, the brush may be conveniently formed by cutting a strip of thin rubber of about the width of the space between the two elements and attaching the middle of this strip to the edge of the arm. It is not essential that the brushes shall actually touch the elements, as the revolution of the arms will cause the electrolyte to move and itself operate to brush the elements.

In bracket 12 is mounted a shaft 19, which carries a pinion 20, which pinion meshes with a gear-wheel 21, mounted upon shaft 14. Shaft 19 is rotated in any suitable manner. In the drawings it is shown as rotated by an electric motor 22, belted by belt 23 to the pulley 24, carried by shaft 19. The motor-circuit is derived in this instance from the battery itself, although obviously the motor may be driven from any convenient source. In the present instance a wire 25 leads from the wires 7 to the controller-arm 26, which contacts with the resistance 27, from which wire 28 leads to motor 22. From motor 22 wire 29 leads to the wires 8.

Upon the cover 11 two supply-tubes 30 and 31 are carried. In the present instance they are respectively supported by the brackets 32 and 33. These tubes extend the length of the cell and are transverse to the various elements. Each tube is provided with a series of nipples 34 35, a nipple of each tube being located opposite each space between the elements of the battery. The nipples 34 and 35 are filled with a core 36 of blotting-paper or other material of comparatively high capillarity, and preferably this core projects into the interior of the tube above the interior surface of the wall of the tube. Suitable openings 37 are provided through the cover into the tubes.

The battery is assembled by sliding the respective elements into position in the grooves 23 and pouring the electrolyte into the spaces between the respective elements. Ordinarily the spaces between the elements will communicate with each other by reason of the elements being raised slightly above the bottom of the cell. The cover 11 is then placed in position, and as the cover carries the gears 20 and 21 and the shaft 14, as well as the tubes 30 and 31, the placing of the cover in position will also place the shaft 14 in position in the recesses 6 and an arm 14, carrying its brush 16, in each of the spaces between the elements. A fluid depolarizing agent—such, for example, as bichromate of potash—is preferably placed in one of the tubes 30 or 31, and sulfuric acid or other acid, according to the nature of the electrolyte, is placed in the other tube 30 or 31. These fluids are poured in through the openings 37. When the external circuit is closed, the motor-circuit will also be closed through the controller-arm 26, and the current from the battery will then drive motor 22 and rotate shaft 14, causing the brushes 16 (or 18) to brush the active surfaces of the elements, and thus prevent polarization. When the rate of speed of the shaft 14 and brushes 16 is varied, the current from the battery will also vary, and, if preferred, the output of the battery may be varied by varying the speed of the motor instead of by resistance in the external circuit. The depolarizing solution and the acid in tubes 30 and 31 will by capillary attraction pass through the cores 36 and drop by drop fall into the electrolyte, thus feeding the depolarizer or acid to the electrolyte as needed. By projecting the inner end of the core into the tube such solid matter as may be in the depolarizer or acid will be prevented from clogging the entire surface of the core, and thus retarding the capillary attraction.

It will be understood that the device above described may be modified in various respects without departing from the invention, and I therefore desire it to be understood that I do not limit myself herein to the specific construction shown.

Having thus described my invention, I declare that what I claim as new, and desire to secure by Letters Patent, is—

1. In a battery, the combination of a casing, a plurality of parallel elements supported in said casing, each of said elements having a recess in the upper portion thereof, a cover for said casing, a shaft having its bearings supported by said cover, said shaft being located within said recesses when the cover is in position, a brush or brushes carried by said shaft, and means carried by the cover for rotating said shaft, substantially as described.

2. In a battery, the combination with the electrolyte, of two oppositely-disposed elements, a radially-mounted arm adapted to rotate in the electrolyte between the said elements and parallel thereto, and a brush of flexible material carried by said arm, substantially as described.

3. In a battery, the combination with the electrolyte, of two oppositely-disposed elements, a radially-mounted arm adapted to rotate in the electrolyte between the said elements and parallel thereto, and a brush comprising a strip of flexible rubber carried by said arm and contacting with one or more of said elements, substantially as described.

4. In a battery, the combination with the electrolyte, of two oppositely-disposed elements, a radially-mounted arm adapted to rotate in the electrolyte between the said elements and parallel thereto, a brush comprising a strip of flexible rubber carried by said arm and contacting with one or more of said elements, and means for rotating said brush at variable rates of speed, substantially as described.

5. In a battery, the combination with the electrolyte, of two oppositely-disposed elements, a radially-mounted arm adapted to rotate in the electrolyte between the said elements and parallel thereto, a brush comprising a strip of flexible rubber carried by said arm and contacting with one or more of said elements, and means for rotating said brush at any determined rate of speed, substantially as described.

6. In a battery, the combination of a casing containing the elements and the electrolyte, a cover for said casing, a revolving brush or brushes, and means for revolving said brushes, said brushes and said means all being supported upon said cover, substantially as described.

7. In a battery, the combination of a casing containing the electrolyte and the elements, a cover for said casing, a shaft carrying a brush or brushes, means for rotating said shaft, and one or more fluid-receptacles having contracted openings in the said casing, said shaft, the means for actuating same and said receptacle all being supported by said cover and so arranged that when said cover is placed in position one of said brushes and one of said openings will be located between the respective elements, substantially as described.

In testimony whereof I affix my signature in presence of two witnesses.

HENRY HALSEY.

Witnesses:
 HENRY BEST,
 C. V. EDWARDS.